(12) United States Patent
Zarins

(10) Patent No.: US 12,000,519 B2
(45) Date of Patent: Jun. 4, 2024

(54) COUPLING FOR CONNECTING TWO SECTIONS OF PIPING WITH WATER TRAP

(71) Applicant: Applied System Technologies, Inc., Charlotte, NC (US)

(72) Inventor: Roman Todd Zarins, Denver, NC (US)

(73) Assignee: Applied System Technologies, Inc., Charlotte, NC (US)

( * ) Notice: Subject to any disclaimer, the term of this patent is extended or adjusted under 35 U.S.C. 154(b) by 108 days.

(21) Appl. No.: 17/971,872

(22) Filed: Oct. 24, 2022

(65) Prior Publication Data

US 2024/0133506 A1  Apr. 25, 2024

(51) Int. Cl.
| F16L 55/24 | (2006.01) |
| F16L 37/00 | (2006.01) |
| F16L 37/091 | (2006.01) |
| F16L 41/02 | (2006.01) |

(52) U.S. Cl.
CPC ............ F16L 55/24 (2013.01); F16L 37/008 (2013.01); F16L 41/021 (2013.01); *F16L 37/091* (2013.01); *Y10T 137/5907* (2015.04)

(58) Field of Classification Search
CPC ... Y10T 137/5907; F16L 55/24; F16L 37/008; F16L 41/021; F16L 37/091
See application file for complete search history.

(56) References Cited

U.S. PATENT DOCUMENTS

| 1,444,727 | A | | 2/1923 | Burdin |
| 2,043,944 | A | * | 6/1936 | Baker ..................... F16L 55/24 |
| | | | | 55/441 |
| 2,146,336 | A | | 2/1939 | Frey |
| 2,457,763 | A | * | 12/1948 | Wiggins ................ B65D 90/30 |
| | | | | 137/590 |
| 3,284,109 | A | | 11/1966 | Parker |
| 3,355,193 | A | | 11/1967 | Craig |
| 3,362,730 | A | | 1/1968 | St Clair |
| 3,471,176 | A | | 10/1969 | Gilchrist |
| 3,489,441 | A | | 1/1970 | William |
| 3,524,466 | A | | 8/1970 | Van Scoy |
| 3,622,184 | A | | 11/1971 | Deasy et al. |
| 3,694,009 | A | | 9/1972 | Phillips |
| 3,986,240 | A | | 10/1976 | Skinner |
| 3,999,785 | A | | 12/1976 | Blakeley |

(Continued)

FOREIGN PATENT DOCUMENTS

| WO | 2005024283 A1 | 3/2005 |
| WO | 2005052425 A2 | 6/2005 |

(Continued)

*Primary Examiner* — Daphne M Barry
*Assistant Examiner* — Frederick D Soski
(74) *Attorney, Agent, or Firm* — Seth L. Hudson; Maynard Nexsen PC

(57) ABSTRACT

A reducing tee that includes a main portion extending from a first end to a second end with an intermediate portion disposed between the first end and the second end. A main passageway extends from the first end to the second end, and a branch extends outwards from the intermediate portion containing a passageway in fluid communication with the main passageway. A water trap having a hollow body with a first open end, a second open end, an exterior surface, an interior surface, and a linear passageway extends between the first open end and the second open end disposed within the reducing tee.

14 Claims, 8 Drawing Sheets

(56) References Cited

U.S. PATENT DOCUMENTS

| | | | |
|---|---|---|---|
| 4,003,407 A * | 1/1977 | Finger | F16L 59/16 |
| | | | 138/112 |
| 4,073,513 A | 2/1978 | Blakeley | |
| 4,158,461 A | 6/1979 | Francis | |
| 4,258,941 A | 3/1981 | Sands | |
| 4,372,586 A | 2/1983 | Rosenberg | |
| 4,613,171 A | 9/1986 | Corcoran | |
| 4,790,058 A | 12/1988 | Miller | |
| 5,000,489 A | 3/1991 | Burke | |
| D334,050 S | 3/1993 | Foxlee | |
| 5,241,979 A * | 9/1993 | Chang | B01D 29/031 |
| | | | 137/550 |
| 5,388,288 A * | 2/1995 | Fell, Sr. | F16L 55/11 |
| | | | 4/679 |
| 5,577,776 A | 11/1996 | Welch | |
| 5,971,001 A | 10/1999 | Andersson | |
| 6,301,917 B1 | 10/2001 | Lacoste | |
| 6,412,824 B2 | 7/2002 | Kunsman | |
| 6,676,166 B1 * | 1/2004 | Wraith | F16L 41/021 |
| | | | 285/86 |
| 6,705,801 B1 * | 3/2004 | Kiest, Jr. | F16L 41/12 |
| | | | 138/97 |
| 7,552,742 B2 | 6/2009 | Dole | |
| 7,644,955 B1 | 1/2010 | Komolrochanapom | |
| 7,731,240 B2 | 6/2010 | Barker | |
| 7,926,855 B2 | 4/2011 | Kitagawa | |
| 7,980,599 B2 | 7/2011 | Schindel | |
| 8,746,752 B2 | 6/2014 | Hayashi | |
| 8,789,853 B2 | 7/2014 | Gershkovich et al. | |
| 8,870,235 B2 | 10/2014 | Turk | |
| 9,228,681 B2 | 1/2016 | Kluss | |
| 9,334,995 B2 | 5/2016 | Kremer et al. | |
| 9,574,691 B1 | 2/2017 | Crompton et al. | |
| 9,810,359 B2 | 11/2017 | Spears et al. | |
| 9,879,814 B1 * | 1/2018 | Mackey | F16L 55/07 |
| 9,920,866 B2 | 3/2018 | Crompton et al. | |
| 9,989,175 B2 | 6/2018 | McAllister et al. | |
| 10,047,884 B2 | 8/2018 | Taylor | |
| 10,309,568 B2 | 6/2019 | Borawski | |
| 10,794,785 B2 | 10/2020 | Hayes et al. | |
| 11,732,827 B1 * | 8/2023 | Nashed | F16L 37/008 |
| | | | 4/679 |
| 11,788,684 B1 * | 10/2023 | Stavropoulos | F16T 1/34 |
| | | | 137/177 |
| 2002/0129858 A1 * | 9/2002 | Meyer | A61L 2/26 |
| | | | 137/625.48 |
| 2004/0163970 A1 | 9/2004 | Chelchowski et al. | |
| 2005/0134038 A1 | 6/2005 | Walsh | |
| 2006/0213652 A1 * | 9/2006 | Shaposhnikov | E21B 41/0078 |
| | | | 166/372 |
| 2008/0011358 A1 | 1/2008 | Brandt et al. | |
| 2008/0106092 A1 | 5/2008 | Klein et al. | |
| 2008/0111376 A1 | 5/2008 | Ferrero | |
| 2008/0203723 A1 | 8/2008 | Cellemme | |
| 2008/0309067 A1 | 12/2008 | Fazakerly | |
| 2009/0208271 A1 | 8/2009 | Krohn | |
| 2009/0267345 A1 | 10/2009 | Choi | |
| 2010/0133152 A1 * | 6/2010 | Taylor | B07B 1/4681 |
| | | | 209/675 |
| 2010/0230957 A1 | 9/2010 | Tsuda | |
| 2010/0314863 A1 | 12/2010 | Ohara et al. | |
| 2012/0306118 A1 | 12/2012 | Hayashi et al. | |
| 2013/0181446 A1 | 7/2013 | Le Clinche | |
| 2014/0238506 A1 | 8/2014 | Adams et al. | |
| 2015/0300549 A1 | 10/2015 | Cheng-Sheng et al. | |
| 2015/0323112 A1 | 11/2015 | Wright | |
| 2016/0040816 A1 | 2/2016 | Cheng-Sheng et al. | |
| 2016/0348490 A1 | 12/2016 | Holm et al. | |
| 2016/0358517 A1 | 12/2016 | Pate et al. | |
| 2017/0205010 A1 | 7/2017 | Pai | |
| 2018/0283767 A1 | 10/2018 | Conley | |
| 2019/0032823 A1 | 1/2019 | McNamara et al. | |
| 2019/0219207 A1 * | 7/2019 | Phillips | F16L 21/02 |
| 2019/0390801 A1 | 12/2019 | Puckett et al. | |
| 2020/0263818 A1 | 8/2020 | Prince | |
| 2020/0273377 A1 | 8/2020 | Tanghetti | |
| 2020/0370687 A1 | 11/2020 | Taylor | |
| 2020/0370699 A1 * | 11/2020 | Gage | F16L 55/165 |
| 2021/0252433 A1 * | 8/2021 | Sahm | B01D 29/54 |
| 2021/0299387 A1 * | 9/2021 | Higginbotham | G06N 20/00 |
| 2022/0088660 A1 | 3/2022 | Wang | |
| 2023/0243450 A1 * | 8/2023 | Venturi | F16L 55/1157 |
| | | | 285/305 |
| 2023/0250907 A1 * | 8/2023 | Ravisankar | F16L 55/1157 |
| | | | 285/305 |
| 2024/0026918 A1 * | 1/2024 | Zarins | F16L 19/065 |
| 2024/0027010 A1 * | 1/2024 | Zarins | F16L 41/03 |

FOREIGN PATENT DOCUMENTS

| | | |
|---|---|---|
| WO | 2005078332 A1 | 8/2005 |
| WO | 2006087749 A1 | 8/2006 |
| WO | 2008097053 A1 | 8/2008 |
| WO | 2010047573 A1 | 4/2010 |
| WO | 2010080027 A1 | 7/2010 |
| WO | 2013056273 A2 | 4/2013 |
| WO | 2016016490 A1 | 2/2016 |
| WO | 2016036841 A1 | 3/2016 |
| WO | 2016064118 A1 | 4/2016 |
| WO | 2016206812 A1 | 12/2016 |
| WO | 2017003023 A1 | 1/2017 |
| WO | 2017004671 A1 | 1/2017 |
| WO | 2018225915 A1 | 12/2018 |
| WO | 2019182192 A1 | 9/2019 |
| WO | 2020036637 A1 | 2/2020 |

\* cited by examiner

COUPLING FOR CONNECTING TWO SECTIONS OF PIPING WITH WATER TRAP

FIELD OF THE INVENTION

The present invention relates generally to a reducing tee and insert for connecting piping, and more generally relates to a reducing tee and insert for engaging at least two sections of piping used to transport compressed air.

BACKGROUND OF THE INVENTION

A compressed air piping system very generally consists of a compressor and piping to carry the compressed air to its desired destination. The piping that carries the compressed air may be placed in a building, such as a plant, stadium, arena, manufacturing facility, hospital, or the like. The piping is not a single piece of pipe laid in a straight line. Instead, the piping is composed of various shapes and sizes of pipe for carrying the compressed air. Each pipe serves a particular function in carrying the compressed air. Segments of pipes need to be joined together or coupled.

In joining segments of pipe, the coupling couples an end of each pipe segment together without affecting the functionality of the piping. The coupling may assist in not only joining two segments of pipe together, but may also assist in changing the direction of the pipe, allowing the piping to bend along a hallway, corridor, or the like. The coupling may also contain an additional inlet or outlet for allowing a measuring instrument to be inserted into the compressed air flow for measuring a particular parameter of the flow, such as flow rate, pressure, temperature and the like. The additional outlet portion may allow the compressed air to be redirected. Likewise, the additional inlet portion may be utilized to introduce another stream of compressed air into the flow of the piping or to introduce an element or item into the stream of compressed air flowing through the piping, such as an additional gas or other component (ions, odor control, etc.).

When compressed air or pneumatic air flows through the piping and couplings liquid can build up in the lined called condensate. Condensate can build up in the main line which is problematic, especially if there is condensate build up in the secondary line that can cause malfunctions or damage to equipment. There is a need for a removing condensate from a line, especially condensate from passing from a main line to a secondary line.

BRIEF SUMMARY OF THE INVENTION

According to an embodiment of the present invention, a coupling includes a main portion extending from a first end to a second end with an intermediate portion disposed between the first end and the second end. A main passageway extending from the first end to the second end. A branch extends outwards from the intermediate portion containing a branch passageway in fluid communication with the main passageway. External threads are disposed on an exterior surface of the first end containing an upper partition line and a lower partition line defined as the exterior surface of the first end, containing no external threads, and extending from the first end to the intermediate portion. External threads are disposed on an exterior surface of the second end containing an upper partition line and a lower partition line defined as the exterior surface of the first end, containing no external threads, and extending from the first end to the intermediate portion.

According to yet another embodiment of the present invention, the branch of the coupling is internally threaded.

According to yet another embodiment of the present invention, the second brand of the coupling is internally threaded.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figures 1A, 1B:
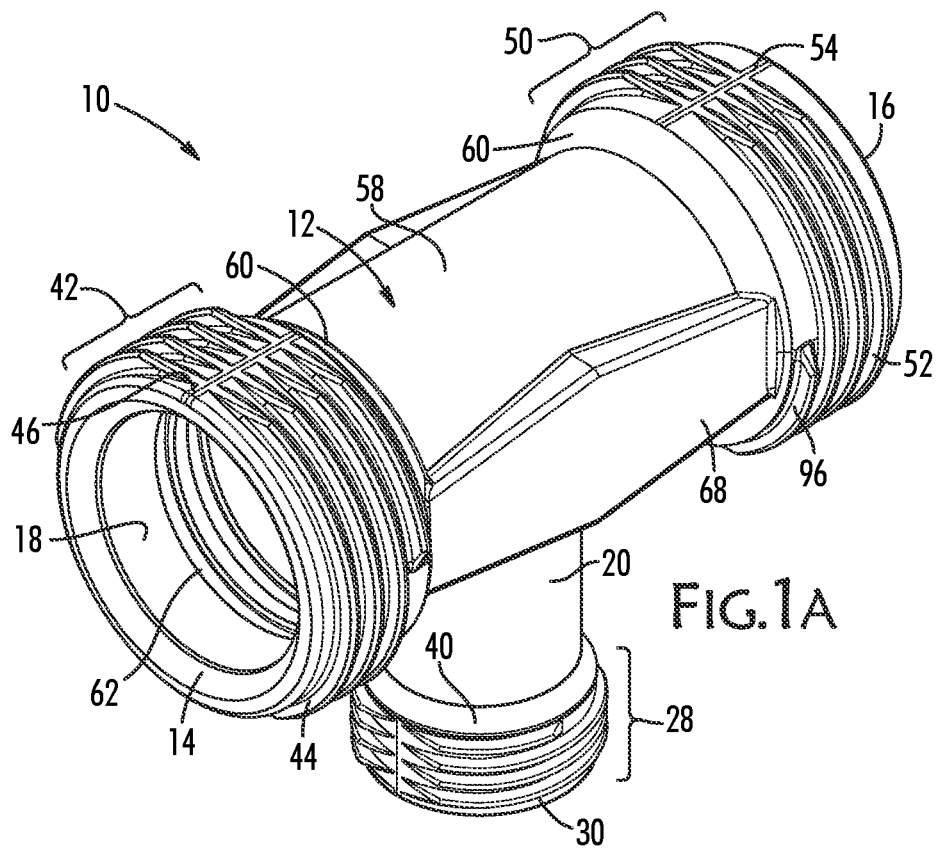
FIG. 1A is a perspective of an exemplary reducing tee.
FIG. 1B is a partial cut-away view of an exemplary reducing tee.

Referring now specifically to the drawings, a reducing tee is illustrated in FIGS. 1A-1D and is shown generally at reference numeral 10. The reducing tee 10 includes a main portion 12 that extends from a first end 14 to a second end 16 defining a main passageway 18 having an axis A-A, as best illustrated in FIG. 1B. The main portion 12 contains an exterior surface and an internal surface, wherein the internal surface serves as the boundary of the main passageway 18. The main portion 12 has a circular cross-section with an inside diameter and an outside diameter.

A branch 20 extends outwardly from the main portion 12. The branch 20 extends outwardly from a branch end 22 at the main portion 12 to an upper end 24. As illustrated, the branch 20 extends outwardly perpendicularly from the main portion 12 at the branch end 22, disposed within the main passageway 18. The branch end 22 is generally circular and forms the opening into the branch passageway 26 from the main passageway 18 and is in fluid communication with the main passageway 18. The branch 20 is located at approximately the midpoint or center of the main passageway 18 between the first end 14 and the second end 16. The branch 20 is preferably cylindrical, having a circular cross-section, with an exterior surface, an interior surface, an inside diameter, and an outside diameter.

Figure 1C:
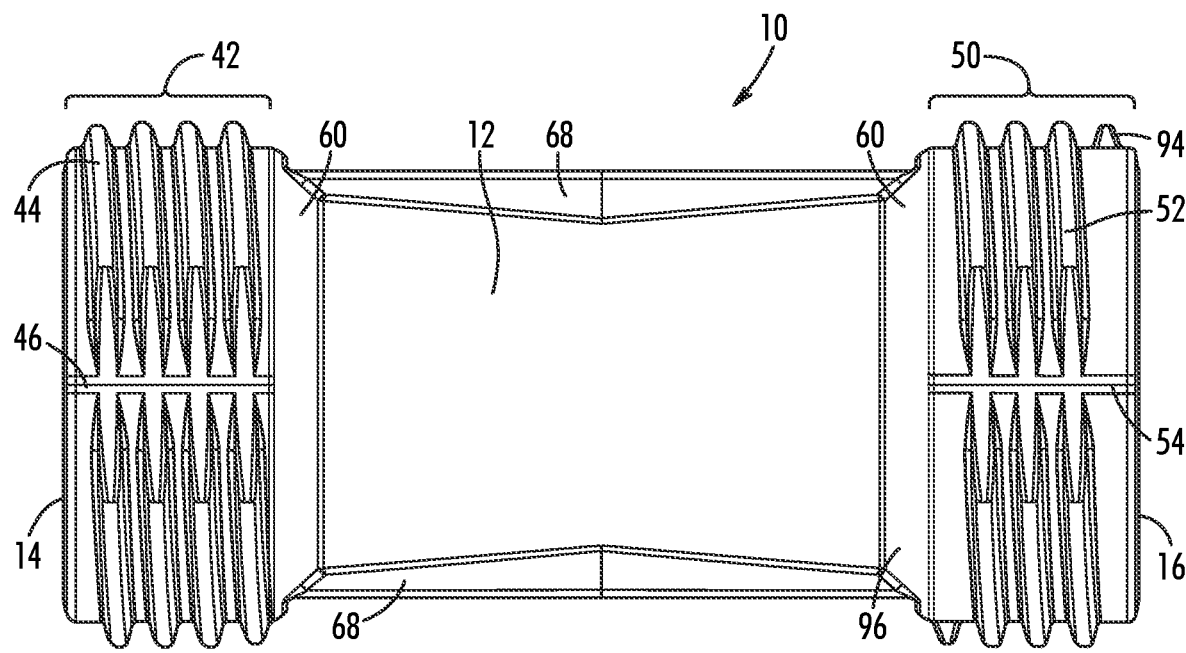
FIG. 1C is a top view of an exemplary reducing tee.
Figure 1D:
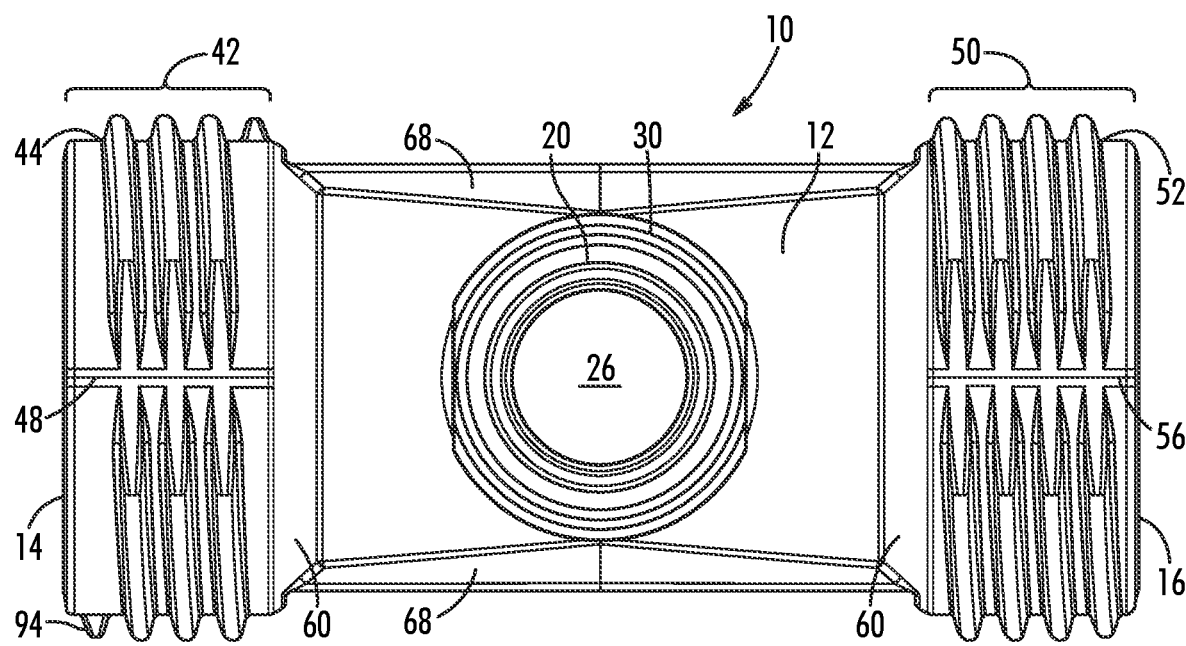
FIG. 1D is a bottom view of an exemplary reducing tee.

The interior surface of the branch 20 defines a branch passageway 26 that extends from the branch end 22 to the oppositely disposed upper end 24, allowing a fluid, such as a gas or liquid, to flow therethrough. The branch end 22 and the upper end 24 each contain an opening to the branch passageway 26, extending between the branch end 22 and the oppositely disposed upper end 24. As illustrated in FIG. 1A, the branch 20 contains an externally threaded portion 28. The upper end 24 of the branch 20 contains an inwardly tapered seat 32, as shown in FIG. 1B, extending internally from an outer edge of the upper end 24. The outer edge of the upper end 24 circumscribes the opening to the branch passageway 26, as shown in FIG. 1D.

Figure 3A:
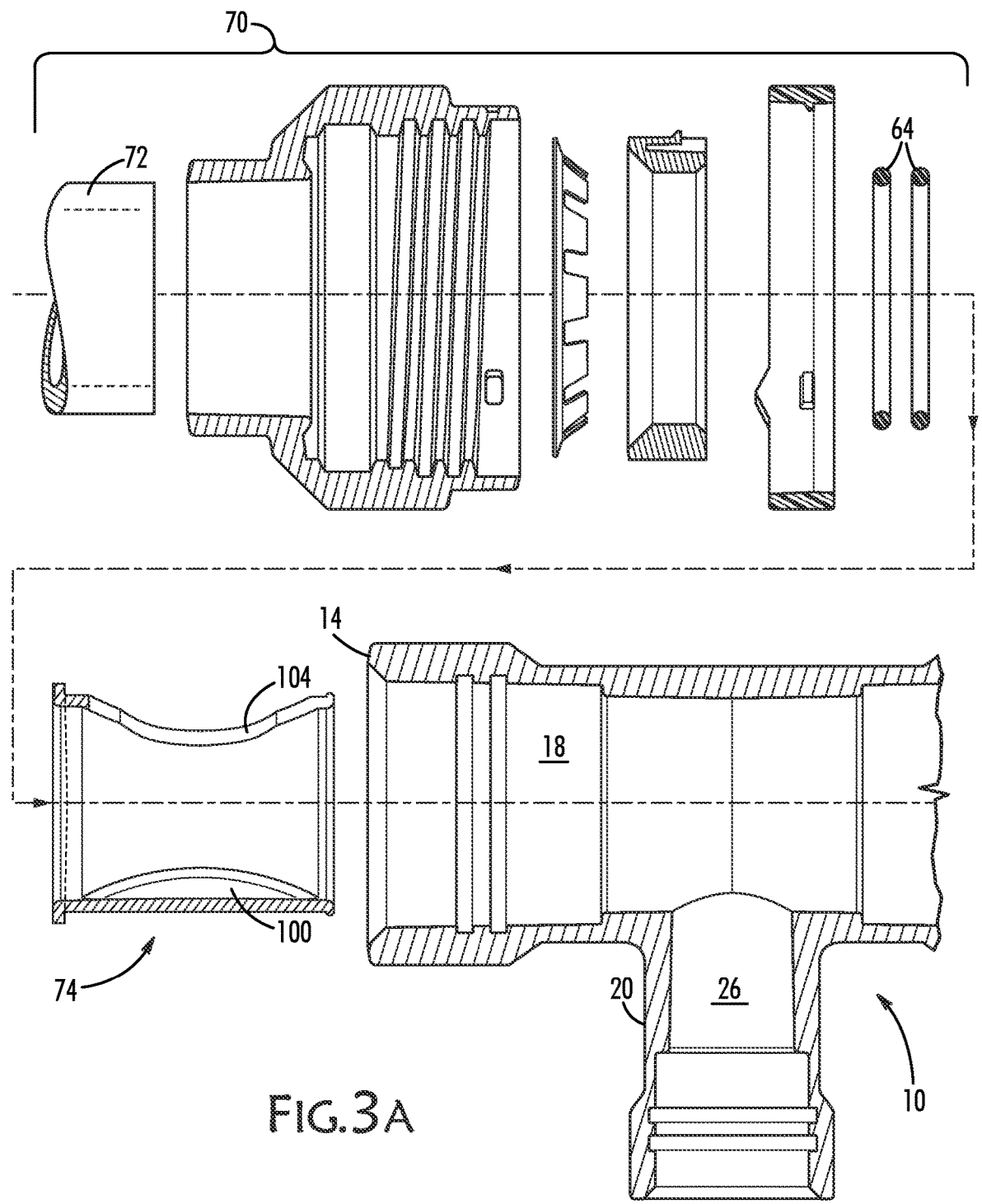
FIG. 3A is an exploded view of a partial reducing tee, water trap, and quick-to-connect fitting.
Figure 3B:
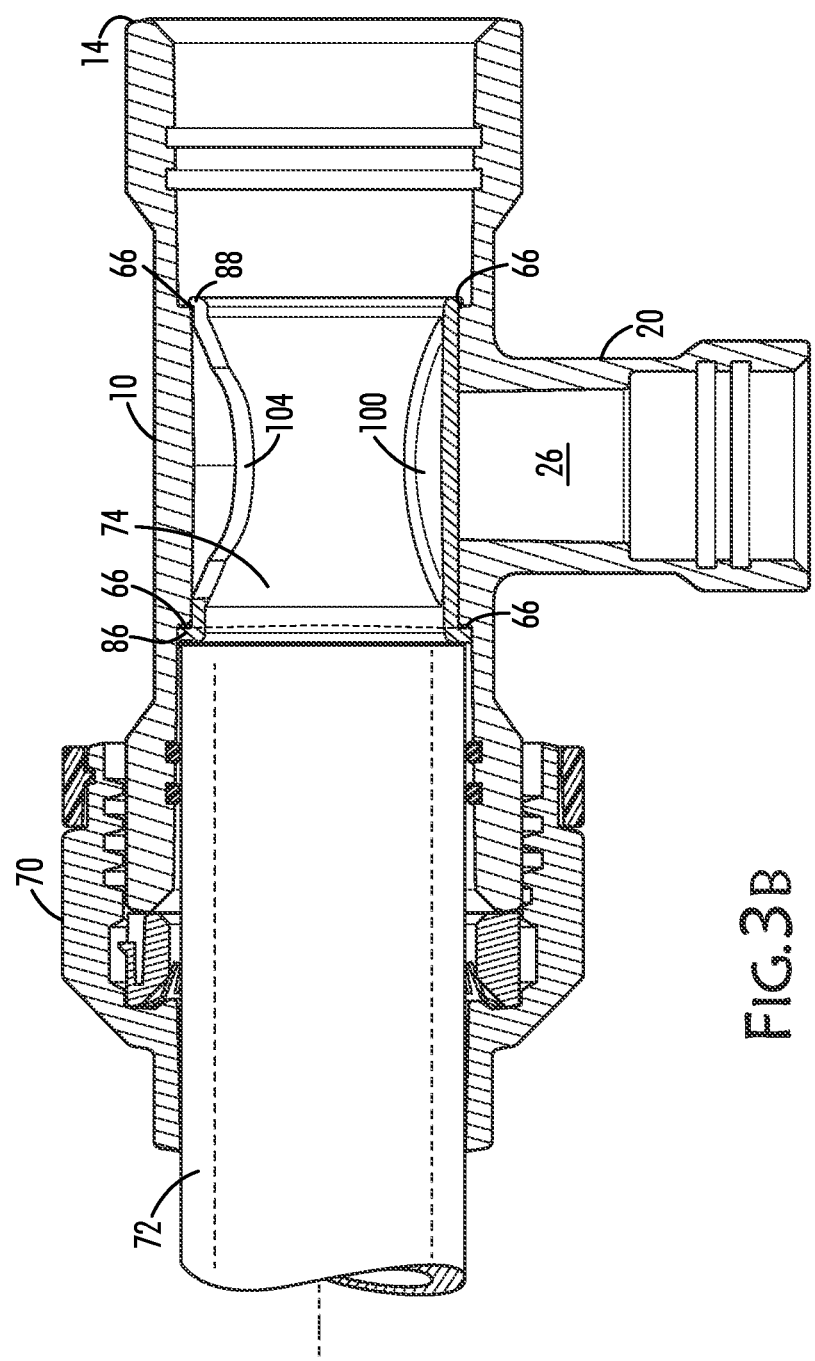
FIG. 3B is a cut-away view of an exemplary reducing tee containing a water trap with a quick-to-connect fitting engaged to the first end of the reducing tee and pipe segment inserted into the reducing tee.
Figure 4:
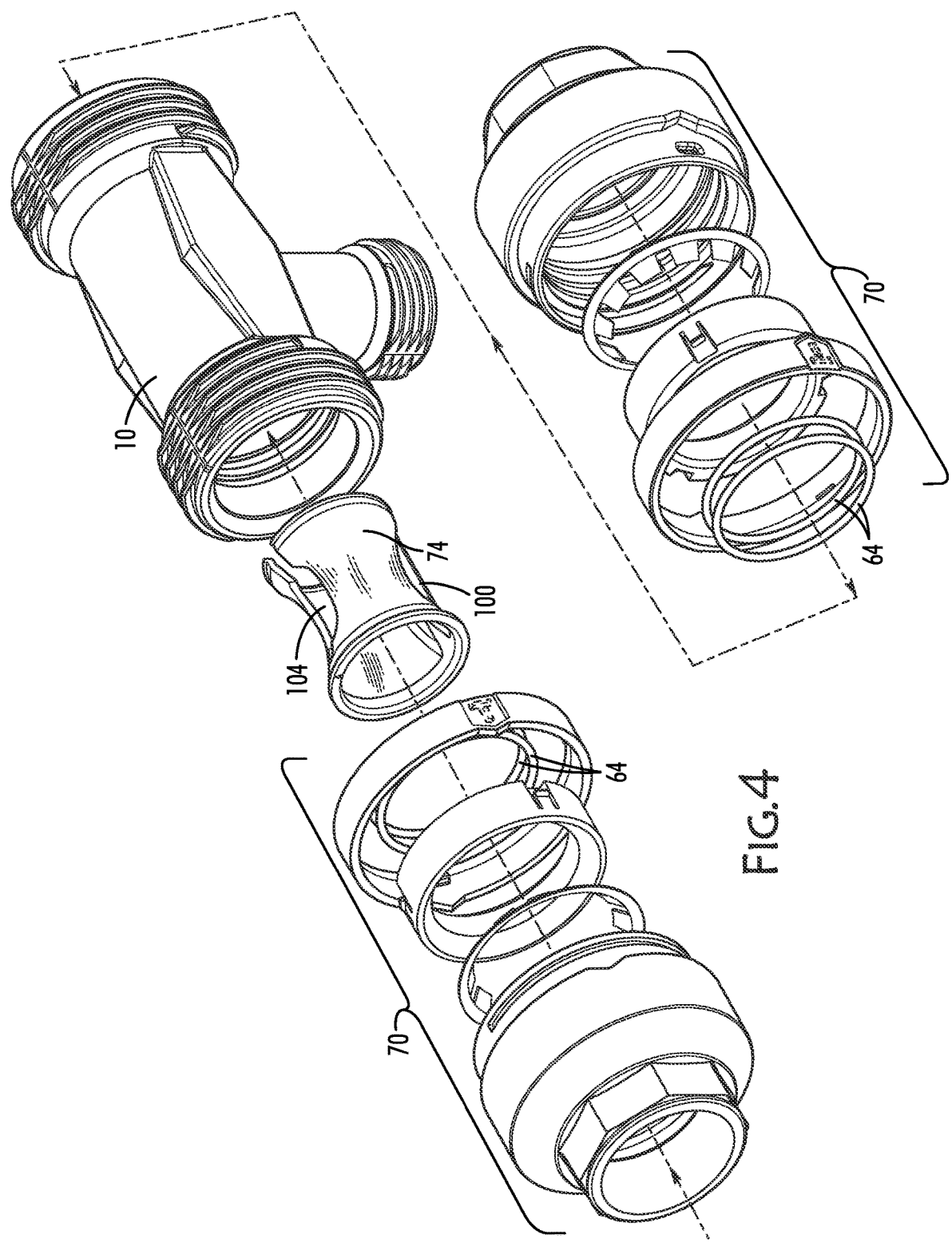
FIG. 4 is an exploded view of an exemplary reducing tee, water trap, and quick-to-connect fittings.

The exterior surface of the branch 20 is preferably smooth and does not contain any threads, ridges, channels, or the like, except for the externally threaded portion 28 containing threads 30. The externally threaded portion 28 is structured to establish a threaded connection with a cooperatively configured fitting or device, preferably a quick-to-connect fitting. The externally threaded portion 20 of the branch 20 is designed to receive an internally threaded fitting or device, preferably a quick-to-connect fitting, similar to the quick-to-connect fitting 70 as shown in FIGS. 3A, 3B, and 4, that corresponds with the threads 30 of the branch 20 for engaging the quick-to-connect fitting to the branch 20. The interior surface contains at least one, and as illustrated, a pair of annular, spaced-apart grooves 34 to accommodate seals or o-rings therein. When a pipe segment is inserted into the opening of the branch passageway 26, the o-rings deform and engage the outer surface of the pipe segment, creating a fluid tight seal between the internal surface of the branch 20 and the exterior surface of the pipe segment. The pipe segment carries a fluid, such as a gas or liquid, and preferably pneumatic air.

As shown in FIG. 1B, the inside diameter of the branch 20 remains constant from the branch end 22 to a transition point along the length of the branch passageway 26. At this transition point, the inside diameter of the branch 20 increases at the transition point, resulting in a shelf 38 being formed. The shelf 38 extends perpendicular to the branch passageway 26, although in other embodiments, the shelf 38 can extend orthogonally to the branch passageway 26. The inside diameter remains constant from the shelf 38 to the seat 32 at the upper end 24 of the branch 20, notwithstanding the grooves 34, and has a greater inside diameter than the inside diameter between the branch end 22 to the transition point along the length of the branch passageway 26, forming the shelf 38.

On the exterior surface of the branch 20, a chamfered portion 40, as shown in FIGS. 1A and 1B, is disposed proximate the threads 30 of the externally threaded portion 28. The chamfered portion 40 creates a smooth transition that is a gradual reduction in the outside diameter between the externally threaded portion 28 and the remainder of the branch 20 to the branch end 22.

The first end 14 of the reducing tee 10 contains an externally threaded portion 42 with threads 44. The threads 44 are disposed on the exterior surface of the first end 14. The threads 40 are angled in relation to the exterior surface of the first end 14 and preferably contains a thread height that corresponds to the pitch of the threads 44. An upper partition line 46 and a lower partition line 48 are defined as the portion on the exterior surface of the first end 14 that the majority of the threads 44 begin and end proximate the upper partition line 46 and a lower partition line 48, as illustrated in FIGS. 1C and 1D. The upper partition line 46 and the lower partition line 48 are longitudinally disposed on the externally threaded portion 42 of the first end 14. As shown in FIGS. 1C and 1D, a majority of the threads 44 begin proximate the upper partition line 46 at the start and extend along the exterior surface of the first end 14 on the externally threaded portion 42 proximate the lower partition line 48. The upper partition line 46 is disposed on the top side of the first end 14 on the externally threaded portion 42, and the lower partition line 48 is disposed opposite the upper partition line 46 on the bottom side of the first end 14 on the externally threaded portion 42. The threads 44 begin proximate to each side of the upper partition line 46 and extend downwardly on each side of the first end 14 to the lower partition line 48. The upper partition line 46 and the lower partition line 48 contain no threads 44 and are formed from the exterior surface of the first end on the externally threaded portion 28. The threads 44 begin and end proximate the upper partition line 46 and the lower partition line 48 at the start and end respectively.

The second end 16 of the reducing tee 10 contains an externally threaded portion 50 with threads 52. The threads 52 are disposed on the exterior surface of the second end 16. The threads 40 are angled in relation to the exterior surface of the second end 16 and preferably contains a thread height that corresponds to the pitch of the threads 52. An upper partition line 54 and a lower partition line 56 are defined as the portion on the exterior surface of the second end 16 that the majority of the threads 52 begin and end proximate the upper partition line 54 and a lower partition line 56. The upper partition line 54 and the lower partition line 56 are longitudinally disposed on the externally threaded portion 50 of the second end 16. As shown in FIGS. 1C and 1D, a majority of the threads 52 begin proximate the upper partition line 54 at the start and extend along the exterior surface of the second end 16 on the externally threaded portion 50 proximate the lower partition line 56. The upper partition line 54 is disposed on the top side of the second end 16 on the externally threaded portion 50, and the lower partition line 56 is disposed opposite the upper partition line 54 on the bottom side of the second end 16 on the externally threaded portion 50. The threads 52 begin proximate to each side of the upper partition line 54 and extend downwardly on each side of the second end 16 to the lower partition line 56. The upper partition line 54 and the lower partition line 56 contain no threads 52 and are formed from the exterior surface of the first end on the externally threaded portion 28. The threads 52 begin and end proximate the upper partition line 54 and the lower partition line 56 at the start and end respectively.

The first end 14 and the second end 16 are disposed on either side of an intermediate portion 58 of the main portion 12. As shown in FIGS. 1C and 1D, a transition portion 60 is disposed at the transition point where the first end 14 transitions to the intermediate portion 58. The transition portion 60 is preferably chamfered, creating a smooth transition that is a gradual reduction in the outside diameter between the first end 14 and the intermediate portion 58. The inside diameter of the first end 14 defines a portion of the main passageway 18 and remains constant even as the first end 14 transitions to the intermediate portion 32 along the transition portion 60. While the outside diameter of the main portion 12 is reduced at the transition portion 60, the inside diameter does not change at this location. The interior surface of the main portion 12 of the reducing tee 10 contains at least one, and as illustrated, a pair of annular, spaced-apart grooves 62 to accommodate seals or o-rings 64, as shown in FIG. 1B. The outer end of the first end 14 contains an inwardly tapered seat, extending internally from an outer edge of the outer end, surrounding an opening to the main passageway 18. Notwithstanding the grooves 62, the inside diameter of the first end 14 and partially the intermediate portion 58 is preferably constant from the outer end to a transition point where the inside diameter is reduced, forming a shoulder 66 disposed within the main passageway 12. The shoulder 66 extends perpendicular or approximately perpendicular to the longitudinal axis A-A of the main portion 12, although in other embodiments, the shoulder 66 can extend orthogonally to the longitudinal axis A-A. At the shoulder 66, the inside diameter of the main passageway 18 is reduced. The first end 14 has an outside diameter greater than the outside diameter of the intermediate portion 58 between the transition portion 60 to the branch end 22.

Likewise, a transition portion 60 is disposed at the point where the second end 16 transitions to the intermediate portion 58. The transition portion 60 is preferably chamfered, creating a smooth transition that is a gradual reduction in the outside diameter between the second end 16 and the intermediate portion 58. The inside diameter of the second end 16 defines a portion of the main passageway 18 and is not reduced as the second end 16 transitions to the intermediate portion 32 along the transition portion 60. While the outside diameter of the main portion 12 is reduced at the transition portion 60, the inside diameter does not change at this location. The interior surface of the main portion 12 contains at least one, and as illustrated, a pair of annular, spaced-apart grooves 62 to accommodate seals or o-rings 64. The outer end of the second end 16 contains an inwardly tapered seat, extending internally from an outer edge of the outer end, surrounding an opening to the main passageway 18. Notwithstanding the grooves 62, the inside diameter of the second end 16 and partially the intermediate portion 58 is preferably constant from the outer end to a shoulder 66 disposed within the main passageway 12. The shoulder 66 extends perpendicular or approximately perpendicular to the longitudinal axis A-A of the main portion 12, although in other embodiments, the shoulder 66 can extend orthogonally to the longitudinal axis A-A. At the shoulder 66, the inside diameter of the main passageway 18 is reduced. The second end 16 has an outside diameter greater than the outside diameter of the intermediate portion 58 between the transition portion 60 to the branch end 22.

The width and/or height of each thread 44, 52 on the externally threaded portions 42, 50 of the first end 14 and the second end 16 increases as the distance increases from the upper partition line 46, 54, until a predetermined distance, at which the width and height of the thread 44, 52 remains constant, until the thread 44, 52 approaches the lower partition line 48, 56, at which point, the width and/or height of the thread 44, 52 decreases as it approaches the lower partition line 48, 56. Except for the start 94 and end 96 generally, each thread 44, 52 begins proximate to the upper partition line 46, 54 or lower partition line 48, 56 and ceases at the upper partition line 46, 54 or lower partition line 48, 56. If a thread 44, 52 begins at the upper partition line 46, 54, the thread 44, 52 will proceed along the exterior surface of the first end 14 and second end 16, ceasing proximate to the lower partition line 48, 56. Likewise, if a thread 44, 52 begins at the lower partition line 48, 56, the thread 44, 52 will proceed along the exterior surface of the first end 14 and second end 16, ceasing proximate to the upper partition line 46, 54. The thread 44, 52 does not extend across either the upper partition line 46, 54 or the lower partition line 48, 56. Instead, the threads 44, 52 are spaced-apart on each side of the upper partition line 46, 54 and lower partition line 48, 56. Except for the thread 44, 52 containing the start 94 and the end 96, the remaining threads 44, 52 only partially circumscribe the exterior surface of the first end 14 and second end 16, extending proximate to the upper partition line 46, 54 to the lower partition line 48, 56.

The start 94 is defined as the initial thread 44 on the first end 14 and second end 16 that is the closest to the outer end of the first end 14 and second end 16. The outer end of the first end 14 and second end 16 surrounds the opening of the main passageway 18 of the first end 14 and second end 16. As illustrated, the start 94 does not extend from the upper partition line 46. 54 to the lower partition line 48, 56. Instead the start 94 is preferably located between the upper partition line 46, 54 to the lower partition line 48, 56. The end 96 is defined as the final thread 44 on the first end 14 and second end 16 that is the closest to the transition portion 60 and the intermediate portion 58. As illustrated, the end 96 does not extend from the upper partition line 46, 54 to the lower partition line 48, 56. Instead the end 96 is preferably located between the upper partition line 46, 54 to the lower partition line 48, 56.

The distance between adjacent external threads 40 of the reducing tee 10 is referred to as the pitch. The pitch is measured parallel to the axis of the first end 14 and the second end 16 between corresponding points on adjacent surfaces in the same axial plane. The preferred pitch of the present inventions is between about 0.1 MM to about 6 MM, more preferably between about 1.5 MM to about 4 MM, and more preferably between about 2 MM to about 3 MM.

The crest of the threads 44, 52 is referred to as the top portion of each thread 44, 52 that is most prominent. The root is the bottom of the groove, which may be the exterior surface of the first end 14 and the second end 16 of the reducing tee 10 between two adjacent threads 44, 52. The flank is the side of the threads 44, 52 from the root to the crest. The angle of the threads 44, 52 is the angle between flanks of adjacent threads 44, 52, measured in an axial plane section. The angle of the threads 44, 52 of the present invention is between about 10° to about 40°, and more preferably about 20° to about 35°, and most preferably 29°. The flank of the threads 44, 52 is between about 30 percent and about 70 percent of the pitch of the threads 44, 52, more preferably between about 40 to about 60 percent of the pitch of the threads 44, 52, and more preferably between about 50 percent to about 60 percent of the pitch of the threads 44, 52.

The threads 44, 52 on the externally threaded portion 42 of the first end 14 and the externally threaded portion 50 of the second end 16 are designed to receive a device or coupling, preferably a push-to-connect fitting 70, as shown in FIGS. 3A, 3B, and 4. The threads 44, 52 are designed to correspond with internal threads within a push-to-connect fitting forming a selectively secured arrangement. A selectively secured arrangement is meant to define that the push-to-connect fitting may be engaged and disengaged from the reducing tee 10 in a relatively easy manner by the hand of a user without the need for tools and without damaging the push-to-connect fitting 70 or the reducing tee 10 during engagement or disengagement. The threads 44, 52 are structured to establish a threaded connection with a cooperatively configured push-to-connect fitting 70.

The grooves 62 within the interior surface of the first end 14 and the second end 16 do not extend into the intermediate portion 58. At least one groove 62 is positioned within the internal surface of the first end 14 below or underneath the threads 44 on the exterior surface. An adjacent, spaced-apart groove 62 may be positioned within the internal surface of the first end 14 below or underneath the threads 44, below or underneath the transition portion 60, or partially below or underneath the threads 44 and partially underneath the transition portion 60. As illustrated, two grooves 62 are positioned within the internal surface of the first end 14, where one groove 62 is positioned below or underneath the threads 52 and the adjacent groove 62 is partially positioned below or underneath the threads 44 and partially positioned below or underneath the transition portion 60.

A least one groove 62 is positioned within the internal surface of the second end 16 below or underneath the threads 52 on the exterior surface. An adjacent, spaced-apart groove 62 may be positioned within the internal surface of the second end 16 below or underneath the threads 52, below or underneath the transition portion 60, or partially below or underneath the threads 52 and partially underneath the transition portion 60. As illustrated, two grooves 62 are positioned within the internal surface of the second end 16, where one groove 62 is positioned below or underneath the threads 52 and the adjacent groove 62 is partially positioned below or underneath the threads 52 and partially positioned below or underneath the transition portion 60.

The reducing tee 10 may contain an indicia marking portion 68 on the intermediate portion 58, which is a raised structure at a height above the outer surface of the intermediate portion 58. The indicia marking portion 68 is raised above the outer surface of the intermediate portion 58 and has a different elevation than the outer surface of the intermediate portion 58. The indicia marking portion 68 may be positioned on the front side and back side of the intermediate portion 58. Indicia is designed to be positioned on or within the indicia marking portion 68. The indicia may be in the form of text, symbols, and/or colors. The text, symbols, and/or colors may be molded, imprinted, and/or marked on the surface or within the indicia marking portion 68. The indicia may contain a company name, trademark, logo and the like.

As illustrated in FIGS. 1A, 1C, and 1D, the indicia marking portion 68 contains a first end and a second end. A top portion and a bottom portion extend between the first end and the second end in a spaced apart fashion, forming a central portion for the positioning or the inclusion of indicia. The first end and the second end of the indicia marking portion 68 has a width, the central portion of the indicia marking portion 68, between the top portion and the bottom portion has a width greater than the width of the first end and the second end of the indicia marking portion 68. The first end is preferably disposed on the transition portion 60 between the first end 14 and the intermediate portion 58, and the second end is preferably disposed on the transition portion 60 between the second end 16 and the intermediate portion 58 on the front side and/or back side of the reducing tee 10.

The first end 14 and the second end 16 serves as a connection portion for a quick-to-connect fitting 70, as shown in FIG. 4. As previously mentioned, the exterior surface of the first end 14 and the second end 16 is externally threaded for receiving corresponding internal threads of a quick-to-connect fitting 70. The interior surface contains at least one, and as illustrated, a pair of annular, spaced-apart grooves 62 to accommodate seals or o-rings 64. When a pipe segment 72, as illustrated in FIGS. 3A and 3B is inserted into the main passageway 18, through the openings in the first end 14 and the second end 16, the pipe segment 72 proceeds into the main passageway 18 until the end of the pipe segment 72 contacts the shoulder 66, preventing the pipe segment 72 from proceeding further into the main passageway 18. The end of the pipe segment 72 is adjacent the shoulder 66 in this arrangement. Preferably, the pipe segment 72 has an outside diameter slightly less than the inside diameter of the main body 12 between the shoulder 66 and opening to the main passageway 18. The end of the pipe segment 72 contacts the shoulder 66 and retained adjacent the shoulder 66 by the o-rings 64. The o-rings 64, within the grooves 62, deform as the pipe segment 72 proceeds through the main passageway 18, allowing the pipe segment 72 to proceed through the pipe segment 72 until contact with the shoulder 66. Once the pipe segment 72 is adjacent the shoulder 66 and cannot proceed any further within the main passageway 18, the o-rings 64 engage the outer surface of the pipe segment 72, creating a fluid tight seal between the internal surface of the main portion 12 of the reducing tee 10 and the exterior surface of the pipe segment 72. Since the reducing tee 10 is designed to allow a fluid, such as a gas or liquid, to flow through the main passageway 18 and branch passageway 26, the fluid tight seal is to be defined to include a fluid tight seal for either gas or liquid flowing through the main passageway 18 and branch passageway 26. The reducing tee 10 is preferably designed to allow a gas, such as pneumatic air, to flow through the main passageway 18 and branch passageway 26. A fluid tight seal means the o-rings 64 are sealingly engaged to the pipe segment 72, or other device or fitting inserted into the main passageway 18, and is a substantial restriction to the flow of fluids between the exterior surface of the pipe segment 72, or other device or fitting inserted into the main passageway 18 and the internal surface of the main portion 12. A plug cap or other device designed to prevent the flow of fluid through either the first end 14 or the second end 16 that is received within the opening in the first end or the second end when a pipe segment 72 is not inserted may be an example of a device that can be inserted, allowing the o-rings 64 to form a fluid tight seal between the main portion 12 of the reducing tee 10.

The width and/or height of each thread 30 on the externally threaded portion 28 of the branch 20 may increase as the distance increases from a first partition line, until a predetermined distance, at which the width and height of the thread 30 remains constant, until the thread 30 approaches the second partition line, at which point, the width and/or height of the thread 30 decreases as it approaches the second partition line. Except for the start and end generally of each thread 30 begins proximate to the first partition line or the second partition line and ceases at the first partition line or second partition line. If a thread 30 begins at the first partition line, the thread 30 will proceed along the exterior surface of the branch 20, ceasing proximate to the second partition line. Likewise, if a thread 30 begins at the second partition line, the thread 30 will proceed along the exterior surface of the branch 20, ceasing proximate to the first partition line. The thread 30 does not extend across either the first partition line or the second partition line. Instead, the threads 30 are spaced-apart on each side of the first partition line and second partition line. Except for the thread 30 containing the start and the end, the remaining threads 30 only partially circumscribe the exterior surface of the branch 20, extending proximate to the first partition line to the second partition line.

Figure 2A:
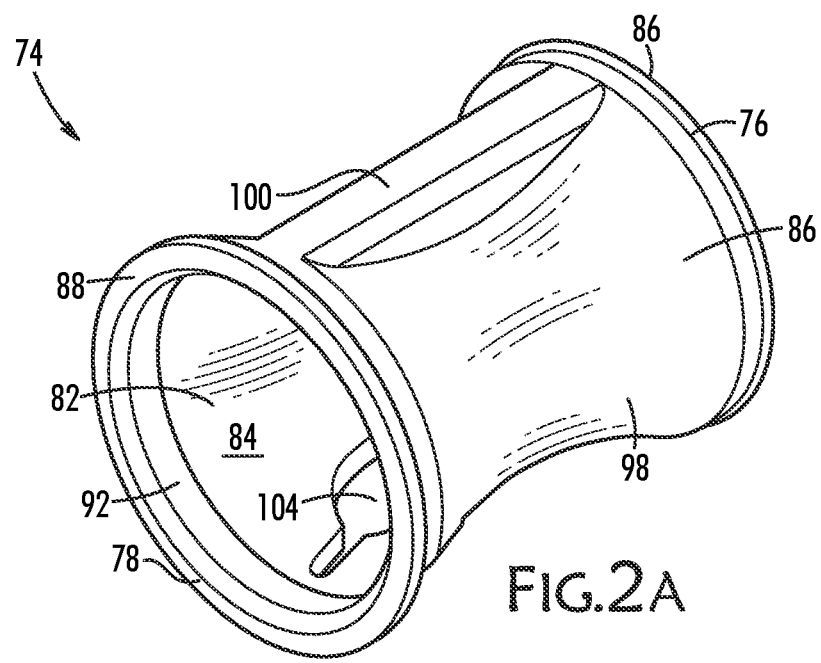
FIG. 2A is a perspective view of an exemplary water trap.
Figure 2B:
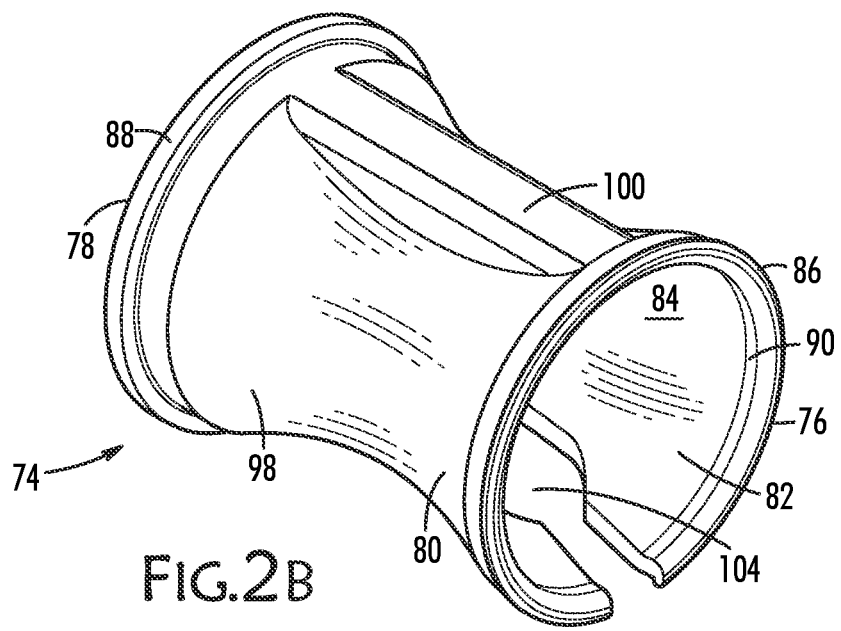
FIG. 2B is another perspective view of an exemplary water trap.
Figure 2C:
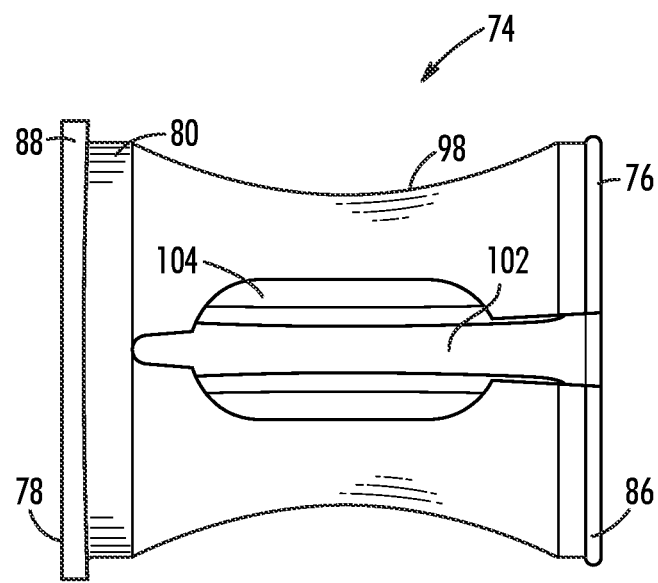
FIG. 2C is a bottom view of an exemplary water trap.
Figure 2D:
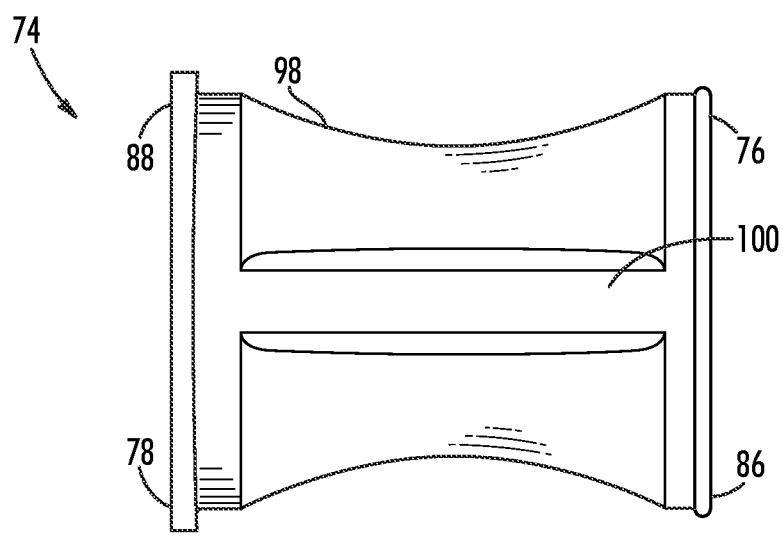
FIG. 2D is a top view of an exemplary water trap.
Figure 2E:
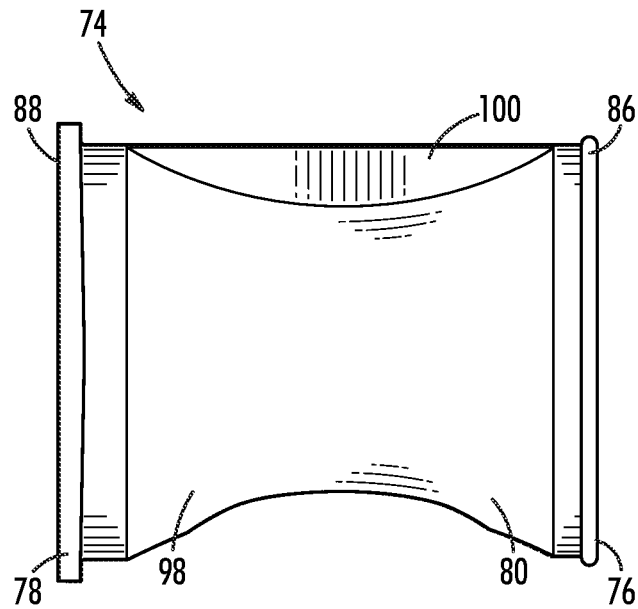
FIG. 2E is a side view of an exemplary water trap.
Figure 2F:
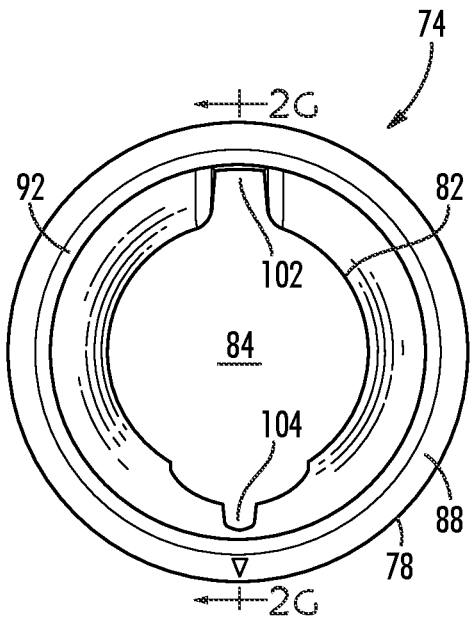
FIG. 2F is an end view of the exemplary water trap.
Figure 2G:
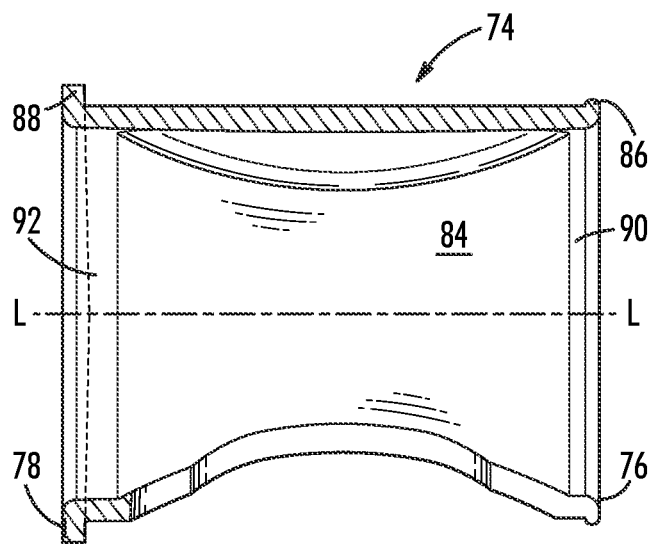
FIG. 2G is a cut-away view of the exemplary water trap along the lines 2G-2G of FIG. 2F.
Figure 2H:
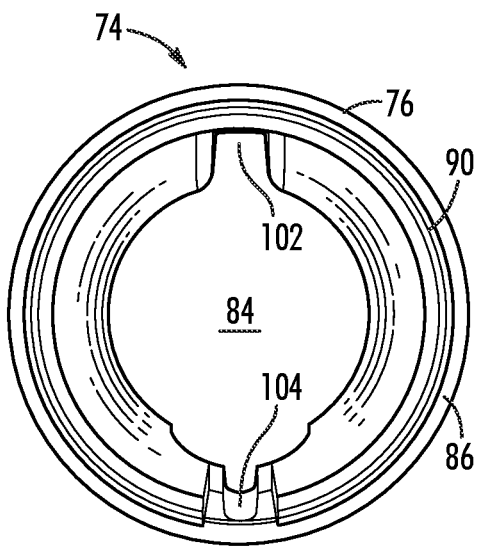
FIG. 2H is another end view of the exemplary water trap.

A water trap 74, as illustrated in FIGS. 2A-H, may be disposed within the main passageway 18 of the reducing tee 10. The water trap 74 contains a first open end 76, a second open end 78, an exterior surface 80, and an interior surface 82. The water trap 74 defines a linear passageway 84 between the first open end 76 and the second open end 78. For reference purposes herein, a longitudinal axis L-L extends from the first open end 76 to the second open end 78. The water trap 74 may be disposed within the main portion 12 of the reducing tee 10, as illustrated in FIG. 2G, such that fluid, including air and liquid, and preferably pneumatic air, can flow through the linear passageway 84 of the water trap 74 when the liquid enters either the opening in the first end 14 or the second end 16 of the reducing tee 10 of the main passageway 18. The water trap 74 can be any size or dimension, and made from any material, including but not limited to plastic, polyvinyl chloride, rubber, metal, or combinations thereof. A first lip 86 extends from the first open end 76 and surrounds the outer edge of the first open end 76 forming an opening of the linear passageway 84. A second lip 88 extends from the second open end 78 and substantially surrounds the outer edge of the second open end 78 forming an opening of the linear passageway 84. A first entrance surface 90 is disposed adjacent the first open end 76 and a second entrance surface 92 is disposed adjacent the second open end 78. An intermediate portion 98 spans between the first entrance surface 90 and the second entrance surface 92, wherein the intermediate portion 98 has a substantially "hour glass" shape, where the two opposed end portions of the intermediate portion 98 have an inside diameter greater than a middle portion of the intermediate portion 98. The inside diameter of the water trap 10 gradually decreases as the intermediate portion 98 progresses from the first entrance surface 90, along the length of the reducing tee 10 to a point on the intermediate portion 98. After the point on the intermediate portion 98, the inside diameter of the water trap 10 gradually increases as the intermediate portion 98 progresses to the second entrance surface, along the length of the reducing tee 10. The point is preferably the midpoint of the intermediate portion 98 or the midpoint of the reducing tee 10. A rib 100 positioned longitudinally spans between the first open end 76 and the second open end 78. As illustrated in FIG. 2E, the rib 100 spans between the first entrance surface 90 and the second entrance surface 92.

The rib 100 has two opposed side portions and a top portion. The two opposed side portions and top portion collectively form a channel 102 within the linear passageway 84 within the interior surface 82. The rib 100 does not have the same "hour glass" shape as the intermediate portion 98. Instead, the two opposed side portions have a semi-circle shape that corresponds with the shape of the exterior surface 80 that they are engaged. The top portion is substantially straight and flat. One the opposite side of the water trap 74 from the rib 100, a geometrically shaped opening 104 is formed. The opening 104 may have any geometric shape and extends from the interior surface to the exterior surface, allowing any fluid proceeding through the linear passageway 84 to exit the water trap 74 through the opening 104. As illustrated in FIG. 2C, the opening 104 is elongated and extends from the interior surface 82 to the exterior surface 80 of the water trap 74. The opening 104 has a first end, a second end, and a central portion disposed between the first end and the second end. The first end extends outwardly from the central portion and contains a first portion and a second portion that are spaced-apart. The first end is defined by an opening within the first open end 76, wherein there is a void within the water trap 74 where the outer edge of the first open end 76 and first lip 86 do not completely surround or circumscribe the opening into the linear passageway 84. The second end extends outwardly from the central portion and contains a first portion, a second portion, and an end portion, wherein the first portion and the second portion are spaced-apart and the end portion, having a substantially arcuate shape, spans between an end of the first portion to an end of the second portion. The second portion of the first end is disposed on one side of the central portion and the second portion of the second end is disposed on an opposite side of the central portion. The central portion contains a first arcuate portion disposed on a top side of the central portion that gradually increases the width of the central portion from the second portion of the first end to a first point, where the width of the central portion stays constant to a second point, and gradually decreases the width of the central portion from the second point to the second portion of the second end and a second arcuate portion opposite the first arcuate portion on the bottom side of the central portion that gradually increases the width of the central portion from the second portion of the first end to a first point, where the width of the central portion stays constant to a second point, and gradually decreases the width of the central portion to the second portion of the second end.

The water trap 74 is disposed within the main portion 12 of the reducing tee 12 and within the main passageway 18. The water trap 74 is preferably disposed within the main passageway 18 of the reducing tee 10 and between the two spaced-apart shoulders 66. The rib 104 is disposed over top or above the opening to the branch passageway 26, as shown in FIG. 3B, and the opening 104 is located in a spaced-apart arrangement with the internal surface of the main portion 12 opposite the opening of the branch passageway 26. The water trap 74 assists in removing liquid build up referred to as condensate and assists in removing the condensate. In one embodiment, compressed air is fed through the main portion 12. A portion of the compressed air may flow through the opening 104 in the water trap 74 and proceed through the branch 20, while the condensate settles to the bottom portion of the water trap 74, opposite the opening 104, by gravity.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. A water trap, comprising:
   a hollow body with a first open end, a second open end, an exterior surface, an interior surface, and a linear passageway extending between the first open end and the second open end, an inside diameter of the first open end and the second open end is greater than the inside diameter at a middle portion of the hollow body;

an opening having a geometric shape extending between the exterior surface and the interior surface; and a rib extending along the exterior surface with a top portion and two opposed side portions, wherein the interior surface of the top portion and interior surfaces of the two opposed side portions collectively form a channel within the interior surface of the hollow body.

2. The water trap according to claim 1, wherein the geometric shape consists of a first end, a second end, and a central portion disposed between the first end and the second end, the first end extends outwardly from the central portion and contains a first portion and a second portion that are spaced apart, the second end extends outwardly from the central portion and contains a first portion, a second portion, and an end portion, wherein the first portion and the second portion are spaced-apart and the end portion, having a substantially arcuate shape, spans between an end of the first portion to an end of the second portion, the second portion of the first end is disposed on one side of the central portion and the second portion of the second end is disposed on an opposite side of the central portion, the central portion contains a first arcuate portion disposed on a top side of the central portion that gradually increases the width of the central portion from the second portion of the first end to a centralized point and gradually decreases the width of the central portion to the second portion of the second end and a second arcuate portion opposite the first arcuate portion on the bottom side of the central portion that gradually increases the width of the central portion from the second portion of the first end to a centralized point and gradually decreases the width of the opening to the second portion of the second end.

3. The water trap according to claim 1, wherein the water trap is composed of plastic.

4. The water trap according to claim 1, further comprising a first lip extending outwardly from the first open end and a second lip extending outwardly from the second open end.

5. A water trap, comprising:
a hollow body with a first open end, a second open end, an exterior surface, an interior surface, and a linear passageway extending between the first open end and the second open end;

an opening within the hollow body comprising a first end, a second end, and a central portion disposed between the first end and the second end, the first end extends outwardly from the central portion and contains a first portion and a second portion that are spaced apart and disposed at the first open end, the second end extends outwardly from the central portion and contains a first portion, a second portion, and an end portion, wherein the first portion and the second portion are spaced-apart and the end portion, having a arcuate shape, spans between an end of the first portion to an end of the second portion; and a rib extending along the exterior surface with a top portion and two opposed side portions, wherein the interior surface of the top portion and interior surfaces of the two opposed side portions collectively form a channel within the interior surface of the hollow body.

6. The water trap according to claim 5, wherein the water trap is composed of plastic.

7. The water trap according to claim 5, further comprising a first lip extending outwardly from the first open end and a second lip extending outwardly from the second open end.

8. A reducing tee, comprising:
a main portion that extends from a first end to a second end with an intermediate portion disposed between the first end and the second end, a main passageway extends from the first end to the second end;

a branch extends outwards from the intermediate portion containing a branch passageway in fluid communication with the main passageway; and a water trap having a hollow body with a first open end, a second open end, an exterior surface, an interior surface, and a linear passageway extending between the first open end and the second open end disposed within the reducing tee, an inside diameter of the first open end and the second open end is greater than the inside diameter at a middle portion of the hollow body.

9. The reducing tee according to claim 8, further comprising external threads disposed on an exterior surface of the first end containing an upper partition line and a lower partition line defined as the exterior surface of the first end, containing no external threads, and extending from the first end to the intermediate portion, and external threads disposed on an exterior surface of the second end containing an upper partition line and a lower partition line defined as the exterior surface of the first end, containing no external threads, and extending from the first end to the intermediate portion.

10. The reducing tee according to claim 8, wherein the branch is externally threaded.

11. The reducing tee according to claim 8, wherein the internal surface of the first end contains at least one annular groove.

12. The reducing tee according to claim 8, wherein the internal surface of the second end contains at least one annular groove.

13. The reducing tee according to claim 8, further comprising an indicia marking portion disposed on at least one side of the intermediate portion for displaying indicia.

14. The reducing tee according to claim 8, wherein the diameter of the first end and the second end is greater than the diameter of the intermediate portion.

* * * * *